Patented June 28, 1927.

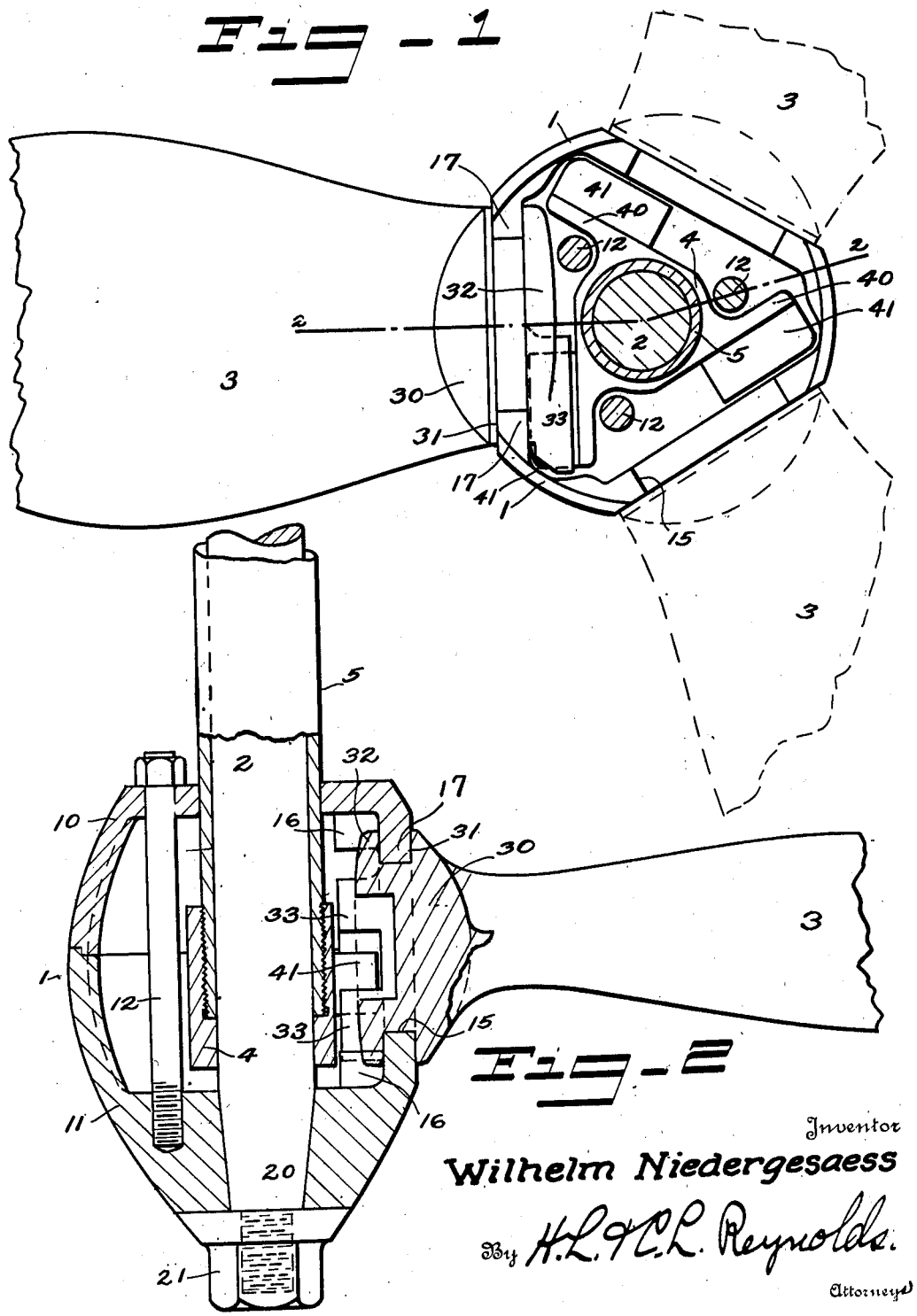

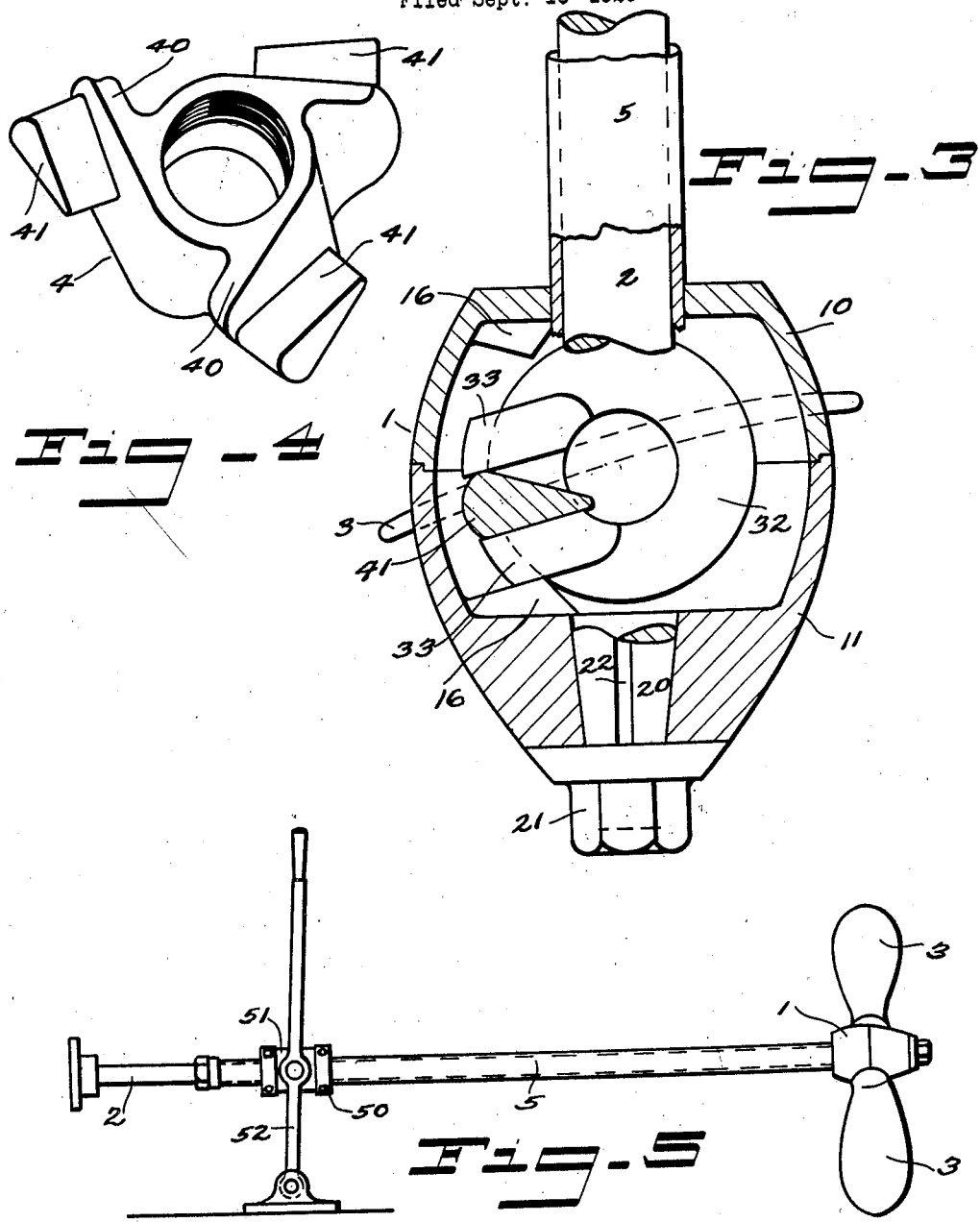

1,633,824

UNITED STATES PATENT OFFICE.

WILHELM NIEDERGESAESS, OF SEATTLE, WASHINGTON.

REVERSIBLE PROPELLER.

Application filed September 16, 1926. Serial No. 135,764.

My invention relates to reversible propellers and specifically to that class of reversible propellers in which the blades are mounted upon the hub so as to be turned upon radial axes for reversal and in which the reversing mechanism is located within a hollow of the hub and is operated by a movement of a reverse block lengthwise of the wheel axis.
The object of my invention is to provide an improved construction which has great strength and in which the parts subject to wear are made of such shape and size that they will wear longer and be less subject to derangement than the constructions previously used.

My invention consists essentially in providing the contact faces of the members which engage to hold the blades in reversed positions, of such shape and angular extent that when engaged and in full reversed positions, the active or holding surfaces will form plane engagements which are of quite material areas.
In the accompanying drawings I have shown a propeller constructed in accordance with the principles of my present invention.

Figure 1 is a section taken through what is approximately the central plane of the hub and propeller, that is, the plane roughly represented by the line of division between the two hub parts.

Figure 2 is a section through the hub taken approximately on an axial plane of the propeller shaft.

Figure 3 is a plane taken substantially on the axis of the propeller shaft but in a different angular position from that shown in Figure 2.
Figure 4 shows in perspective the reversing block which is contained within the hollow of the propeller hub and Figure 5 is an assembled drawing showing the relative position of the propeller and the means employed for shifting the angular position of the propeller blades.

In the type of reversible propeller which is the subject of my present invention, the hub 1 is made hollow and the shaft 2 extends through the hub and is secured by a tapered section 20 at its outer end to the outermost section 11 of the hub, by the use of the nut 21. Preferably a key 22 is employed in this section of the shaft and hub. The two sections 10 and 11 of the hub are joined along a plane which is normal to the axis of the shaft 2. The two hub sections are secured together in rigid relation by the use of bolts 12, of which three are shown in the propeller illustrated, this being a three-bladed propeller.

The hub casing is provided with an opening and a holding flange surrounding the same, for each blade of the propeller. These flanges 17 are preferably located in planes which are normal to the radius of the particular blade which they are intended to hold.

Each of the propeller blades 3 is provided at its inner end with a hub, which hub is provided with a groove extending about the same in a plane which is normal to its axis. This groove 31 leaves two hub flanges, as the flange 30 which is outside of the hub, and the flange 32 which is within the hub. This groove and the said flanges closely embrace the flanges 17 of the hub so that the blades are held firmly and yet may be turned about their longitudinal axes. As the opening in the hub which receives the hub end of the blade is based upon the plane which divides the two halves of the hub, the blades may be readily placed and removed by separating the two halves of the hub.

The propeller shaft 2 is, at its rear end, surrounded with a sleeve 5, upon which is mounted the reverse block 4. Means are provided by which this may be shifted a limited distance lengthwise of the propeller shaft. Any means by which this may be secured may be used. The means illustrated as employed in Figure 5 consists of securing a grooved block 50 upon the sleeve at any convenient point within the boat, upon which block is mounted a collar 51, which collar is engaged by a pivotal connection with the shifting lever 52.

Secured to that end of the sleeve 5 which is within the propeller hub, is the reverse block 4. This block is shown as secured by connecting the threaded end of the sleeve 5 within a threaded socket formed within the reverse block. The reverse block is shown as provided with arms 40, equally numbered to the number of blades in the propeller, which arms are each provided with a lug 41, which lug extends outwardly and between complemental lugs 33, carried by the inner flange 32 of the hub of the blade. These lugs 33, as carried by the hub of the blade, are located eccentrically of the axis of the blade, so that if a force is applied thereto acting in a direction of the length of the shaft, the blades may be turned so as to reverse their angular position and thus reverse the direction of action of the propeller.

The lugs 41 carried by the reverse block and the lugs 33 carried by the propeller blade, are given such shape that the acting faces of both lugs will make plane contacts when the blade is in working position. That is, the faces which are in contact when the blades are in full adjusted position, will be planes of material area. In previous propellers of this type one of these members consists of a round pin which gives contact areas of very small size. This results in wear and this in a certain amount of looseness in the blade, whereby a certain angular twisting of the propeller blade about its longitudinal axis is possible.

By constructing the lugs 33 and 41 in the manner illustrated so that when in adjusted position such as is, for instance, shown in Figure 3, the acting faces will be plane surfaces, I provide against such wear occurring. In doing this it is necessary to make the contact faces of one or both of the members non-parallel with the radius of swing of the blade hub. In the construction illustrated the inner faces of the lugs 33 of the blade hub are shown as parallel with this radius of swing, which makes it necessary to have the side faces of the lug 41 of the reverse block converging towards each other, thus making these seem a wedge block. Whichever of these wedge surfaces is acting as the holding surface, is in full face or plane engagement with the lug of the blade hub. It is, of course, obvious that this angularity of position may be divided between the blocks 33 and 41.

To insure permanency in the angularity of adjustment of the blades, I have provided stop lugs 16 carried by the hub. One of these lugs for each blade is carried by the hub section 10 and another lug for each blade by the hub section 11. These are shown as provided with faces contacting with the lugs 33 of the blade hub by plane surfaces which are also of material area. The contact faces of the stop lugs 16 may be dressed by hand or otherwise, to accommodate the different pitches in the blades of propellers. In other words, if a high pitch is desired in the propeller blades, the stop lugs will be dressed down more than if a moderate pitch is desired.

With all of the contacting faces of the lugs, both of the hub, the propeller blade and of the reverse block, made as plane surfaces, so that the faces which are at any time active to resist the strain form plane contacts, wearing of these surfaces is, for practical purposes, eliminated, so that when properly set in the hub, use of the wheel will not disarrange the accuracy of the set and change the pitch of the propeller blade. This result is the one which is chiefly desired in my present invention.

By using stop lugs 16 on the hub, these being dressed down as needed to secure the desired pitch, I have found it possible and thoroughly practical to make blades for a given diameter of wheel alike for all pitches. Differences of pitch are secured by variation in the position of the faces of lugs 16. It is thus possible to have blades which are standard for all pitches, so that the same blade may be used for any pitch of wheel. This makes quick replacement of broken blades possible by keeping but very few spare sizes.

In practice the blade lugs 33 are held in contact with the stop lugs or faces 16 under a slight pressure conveyed thereto through the reversing mechanism. This prevents any back lash or looseness which would permit slight turning of the blades about their axes, thereby producing changes in actual pitch and resulting inefficiency of operation. Prevention of wear upon the holding surfaces, represented by the contact surfaces of the parts 16, 33 and 41, means maintenance of accuracy of pitch and efficiency of action, and this results in increased efficiency in the driving or power unit.

What I claim my invention is:

1. In a reversible propeller, a hollow hub, blades mounted to turn upon the hub about radial axes when reversing, the hub ends of the blades having holding lugs located within the hollow of the hub and eccentric of their reversing axes, a blade controlling member movable within said hollow lengthwise of the propeller axis, said controlling member having lugs engaging the lugs on the hub ends of the blades, the active engaging faces of said lugs being angularly positioned to make plane contacts between the acting faces when in adjusted positions.

2. In a reversible propeller of the type in which the blades are turned about radial axes when reversing, the combination with a hollow hub in which said blades are journaled, lugs projecting from the inner end faces of the blade hubs, a shifting member movable lengthwise of the propeller axis and having lugs extending between the lugs of the blades and having side faces inclined towards each other at an angle such that they make a full face contact with that lug of the blade through which the holding pressure is applied.

3. In a reversible propeller in combination with a hollow hub casing and separate blades, the hub and blades having interlocking holding surfaces permitting turning of each blade about its longitudinal axis, a reversing member within the hub movable lengthwise of the hub axis, the blades and said reversing member having engaging lugs located within the hollow of the hub and eccentric of the axes of the blades and the hub casing having stop surfaces engaged by the lugs of the blades to limit the axial turning angle of the blades, said lugs of the reversing member of the blades and of the hub casing having surfaces which when the blades are fully shifted, form plane engagements.

4. In a reversible propeller, a hollow hub, blades journaled in the walls of the hub to turn about radial axes when reversing, the inner ends of the blades having inwardly projecting holding lugs located eccentric of their reversing axes, a blade controlling member movable lengthwise of the propeller axis between the inner ends of the blades, said controlling member having lugs engaging the lugs on the hub ends of the blades, the hub having limit stop lugs at opposite ends of the hub chamber engaged by the said lugs of the blades when the blades are in full adjusted position, the action engaging faces of all said lugs being angularly positioned to make plane contacts when the blades are in full adjusted positions.

Signed at Seattle, Washington, this 8th day of Sept. 1926.

WILHELM NIEDERGESAESS.